Jan. 28, 1969   A. G. STILES   3,424,195
AUTOMATIC AIR FLOW CONTROL DEVICE FOR DUCT SYSTEMS
Filed Oct. 24, 1966

INVENTOR.
ARTHUR G. STILES
BY
Drewry Edwards
ATTORNEYS

United States Patent Office 3,424,195
Patented Jan. 28, 1969

3,424,195
AUTOMATIC AIR FLOW CONTROL DEVICE
FOR DUCT SYSTEMS
Arthur G. Stiles, 4581 Allison,
Wheat Ridge, Colo. 80033
Filed Oct. 24, 1966, Ser. No. 588,978
U.S. Cl. 137—504                               11 Claims
Int. Cl. G05d 7/01

This invention relates to a flow control valve or device for installation in a duct of an air delivery system, such as a ventilating system for buildings, which may be utilized in distributing air from a central supply apparatus for heating or cooling areas within the building. In a more specific application the flow control duct of the present invention will be associated with the air delivery ducts extending from a central air conditioning apparatus to a plurality of room outlets.

Systems of this character are in general usage and it is well known that fluid pressure variations in the distribution lines or ducts of the system cause varying rates of flow which may result in establishing unwanted temperatures at discharge locations, and which create a noise factor at discharge points which is annoying to occupants of such locations.

It is an object of the present invention to provide a simple, durable and efficient flow control device located in a duct of a distribution system which is operable by the flow rate through the duct and is self-adjusting to maintain a substantially uniform discharge flow from the duct during periods of variable pressures in the air flow delivered into the duct.

Another object of the invention is to provide a flow control device in a duct of an air distributing system which is capable of providing long periods of efficient operation without adjustment or repair.

A further object of the invention is to provide a device for automatically controlling flow through the discharge end of a duct in an air distributing system which is capable of establishing a substantially constant discharge flow rate regardless of wide variations in pressure of the air supply to the duct.

Other objects reside in novel details of construction and novel combinations and arrangements of parts, all of which will be set forth in the course of the following description.

The flow control device of my invention provides a number of innovations in regulation of air discharge through a duct system distributing blower-impelled air from a central supply. Only one moving part is required, namely, a hinged connection for a swinging member, and by providing a durable bearing surface, the device is capable of operating efficiently without servicing or repair for a period in excess of the normal life of the system in which it is installed.

Another innovation is the provision of a flow control device so designed that it will operate efficiently in either horizontal or vertical ducts with only one extra, stationary part required in the vertical duct installation.

Still another innovation is the provision of a control device operable by air flow through a duct which operates efficiently on pressure drops as low as 0.15 inch water, static, and therefore is well-suited for use in low pressure ventilating systems.

The practice of my invention will be described with reference to the accompanying drawings illustrating typical structural embodiments. In the drawings, in the several views of which like parts bear similar reference numerals:

Figure 1:
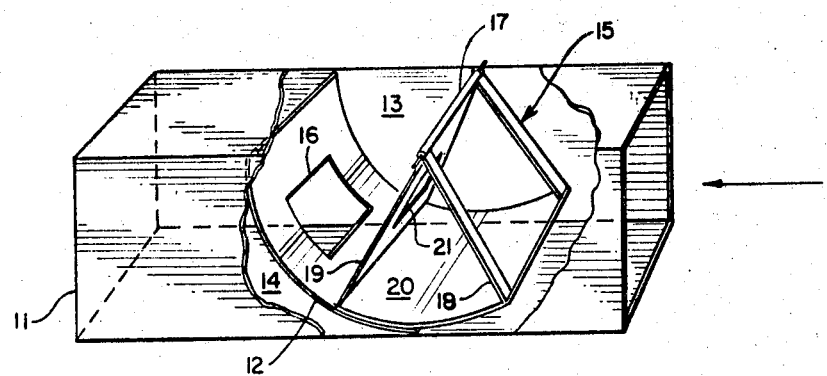
FIG. 1 is a perspective view of a duct section partially broken to show the arrangement of one embodiment of the flow control device of my invention in the interior of said duct which is disposed in a substantially horizontal position.
Figure 4:
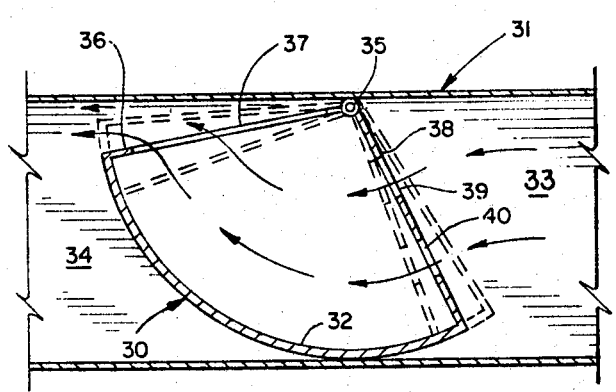
Figure 3:
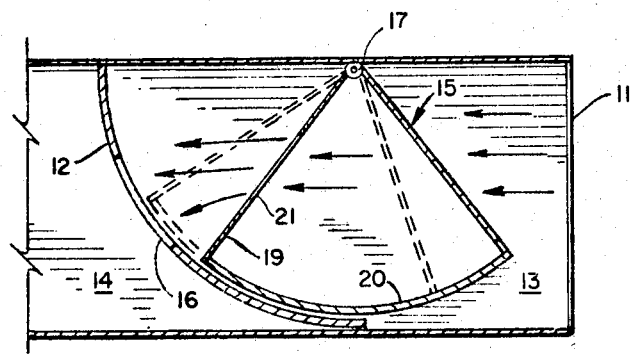

FIG. 3 is a vertical section through a duct containing a flow control device of the type shown in FIG. 1 with the position of the swinging member of the control represented in full line at an at rest position, which it assumes when no air is flowing through the duct, and with a dashed line representation of the range of movement of the swinging member when air is flowing through the duct; and FIG. 4 is a vertical section through a horizontal duct section showing another embodiment of flow control device. The solid line position represents a stabilized position of the swinging member balancing pressure drop at the plural orifices to the weight of the member and the dotted lines represent the ranges of movement when air is flowing through the duct under variable pressures.

As shown in FIG. 1 a section of duct 11, here shown as being rectangular in section, of the type used in the distributing lines of an air supply system, such as an air conditioning system, has its interior divided by partition 12 into an upstream portion 13 and a downstream portion 14. Partition 12 is a segment of a cylinder having a center which is concentric with the pivotal axis of a swinging member 15, and has an orifice 16 which preferably is of rectangular shape and disposed intermediate the ends of the partition, which are secured in sealed relation to the top and bottom surfaces respectively of duct 11 and centrally of the sides of said duct. The orifice 16 comprises the sole flow path for air between upstream portion 13 and downstream portion 14. One or a plurality of orifices may be provided and shapes of the orifice may be varied in forming partition 12.

Swinging member 15 is supported from the sides of duct 11 by a shaft 17 journalled for rotation about bearing surfaces in or supported from the opposed sides, or as an alternative arrangement, alined pivots may extend inwardly from the opposed sides of duct 11, and a cross-connecting sleeve member forming the apex of the angular sides of member 15 will be supported at its ends by the pivots. Preferably the sleeve will be formed of a material having a low friction surface, such as nylon, which permits relatively free swinging movement on the pivots. Another form of bearing which may be utilized is a knife edge type similar to those used in analytical balances. The angularly-disposed ends 18 and 19 of swinging member 15 are interconnected by an imperforate segmental portion 20 of substantially the same but slightly less width than the interior of duct 11. The imperforate portion also is a segment of a cylinder whose center is the axis of rotation of shaft 17 but of slightly less radius than partition 12. The upstream end 18 of swinging member 15 is apertured so that it is essentially an open end. The downstream end portion 19 has one or a plurality of openings 21 of approximately equivalent or greater volume than opening 16 so that aperture 16 will receive the full upstream flow.

As illustrated in FIG. 3 when no air is flowing through duct 11, the swinging member 15 hangs with its center of gravity in the vertical plane of shaft 17 and in this position orifice 16 is unobstructed by the imperforate segmental surface of the swinging member. When air is flowing there is a pressure drop through orifice 21 which causes member 15 to swing on shaft 17 and a part of the imperforate segmental portion 20 is moved into lapping relation to the lower part of orifice 16 causing a partial blockage of the orifice. This blockage restricts the air flow and reduces the pressure drop through the orifice 21 causing the swinging member to return toward the no flow position. When a constant supply of air pressure is developed a position of stability is reached in which member 15 remains substantially stationary and orifice 16 is only partially blocked. If air pressure increases, member 15 swings to block a greater part of orifice 16 and a reduction in air pressure produces a movement providing less blockage of the orifice.

The position adjustments described above occur almost immediately following a pressure change as only slight movements are required. This results in the air flow from duct portion 13 to portion 14 being held substantially constant within narrow limits regardless of wide variations in pressure of the air supply. The device will operate efficiently on pressure drops as low as 0.15 inch water, static, which makes it particularly suited for use in low pressure ventilating systems. Also, because the device has no external controls or sensing devices its use greatly simplifies the intial adjustment of a ventilating system, and thereafter the self-adjusting action of the control devices keeps the system in adjustment.

Figure 2:
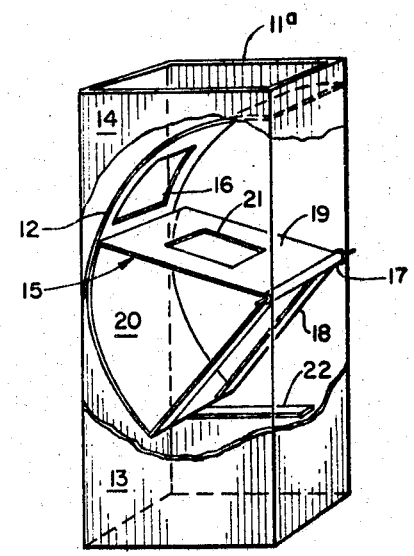
FIG. 2 is another perspective view of a duct section disposed in a substantially vertical position with surfaces of the duct omitted to show the interior arrangement of a flow control device of the type shown in FIG. 1.

The control device shown in FIG. 2 is the same structural arrangement as in FIG. 1 with one additional part in the assembly and with the duct 11a disposed in a vertical line of a distribution system. The partition member 12 divides the interior space of duct 11a into an upstream (lower) portion 13 and a downstream (upper) portion 14, and is a structural duplicate of partition 12 of FIG. 1, inclusive of orifice 16. The swinging member 15 of FIG. 2 also is a structural duplicate of member 15 of FIG. 1, but due to the location of its shaft 17 at a lower elevation than opening 16 in partition 12 it needs to have its gravitational swing limited when no air is flowing in duct 11a as indicated by the directional arrow. A stop 22 having its ends secured in opposed walls of duct 11a limits such downward movement and maintains surfaces of swinging member 15 in position to intercept and direct air flow so as to elevate a portion of imperforate surface 20 into lapping relation with opening 16 when adequate air pressure is developed.

From the foregoing description it will be apparent that the structural arrangement shown in FIG. 2 is a complete duplicate of the structural arrangement of FIG. 1, except for the addition of the stop member 22. This member may be of any suitable composition and preferably will have a resilient contact surface on which the swinging member comes to rest. In its operation, the control device of FIG. 2 functions in a manner similar to that described with respect to FIG. 1 and is self-adjusting in response to pressure variations in upstream portion 13 of duct 11a. While the swinging of member 15 is enhanced by the gravitational effect when pressures are reduced, the total weight of the swinging member will be such that it is moved upwardly readily under pressures required to reduce the effective size of opening 16.

The structural arrangement shown in FIG. 4 does not provide a partition, but a swinging member 30 having a segmental imperforate surface 32 restricts air flow between an upstream portion 33 of a duct section 31 and a downstream portion 34 therein. Member 30 swings on a horizontal shaft 35 adjacent the top surface of horizontal duct section 31. Surface 32 is a greater than 90° segment of a cylinder having its center concentric with shaft 35 and surface 32 is disposed in close clearance with the internal bottom and side surfaces of duct section 31 and functions like a baffle or partition in directing air flow through duct section 31.

Angularly disposed end members support surface 32 in swinging relation to shaft 35. End 36 has a large aperture 37 permitting almost unrestricted discharge flow. The other end 38 has one or a plurality of orifices, here shown as two orifices 39 and 40, constituting the only flow path for air passing from upstream portion 33 to downstream portion 34. End 38 is otherwise imperforate and the air flow striking its imperforate surface imparts swinging movement to member 30 thereby elevating end 36 close to the top surface of duct 31 and narrowing the flow path into downstream portion 34 of the air stream passing downstream from orifices 39 and 40, which path or space is less than or does not exceed the combined volume of orifices 39 and 40.

Swinging member 30 is fabricated of lightweight material and swings substantially beyond the center of gravity position when air is flowing in duct 31, but tends to assume a gravitational return to said position when pressure in the flow decreases. Thus, surface 32 moves relative to the top of the duct to vary the gap therebetween and cooperates with orifices 39 and 40 to increase air flow away from the orifices when pressure therein decreases and to decrease the discharging flow when pressure at the orifices increases. In this way, a substantially uniform pressure is maintained at said orifices during pressure changes in the air flow into upstream portion 33. The dash line positions represent the range of swinging movement and the full line position of swinging member 30 is representative of a stabilized position during continuous air flow in the duct.

While the control devices of the present invention may be constructed and assembled so that they can be installed in existing ducts of operating systems, it will be preferable when such a control device is to be incorporated in new installations to have the duct section built with the control device installed therein substantially as shown in FIGS. 1, 2 and 4. In such event the ends of the duct will have the usual shaping for connection with forward and rear duct extensions. The size and shape of the duct may be changed to conform to the sizes and shapes of the installation in which the control device is to be located. In all such arrangements the swinging member will be of a size to provide close clearance with the adjoining walls of the duct section in which it is mounted and with the segmental partition when the control device embodies the form shown in FIGS. 1 and 2.

Both single orifice and plural orifice arrangements have been illustrated in the drawings and either may be used in any of the various embodiments of my invention. The drawings are intended to illustrate conventional ducts of rectangular section but the invention will be effective if tubular ducts are used and the partition member is shaped to completely seal the passage. Other changes may be availed of within the scope of the hereunto appended claims.

I claim:

1. The combination with a duct of an air-conducting system, of flow-regulating means within the duct controlling air flow from an upstream to a downstream portion of the duct, including structure having at least one orifice for passing air flow from the upstream to the downstream portion, and associated structure having an imperforate segmental surface disposed for swinging movement in said duct under the impelling flow of the air stream in said upstream portion and cooperating with said orifice for decreasing resistance to air flow through the orifice when the pressure at the orifice decreases and increasing resistance to air flow through the orifice when the pressure at the orifice increases, and thereby maintaining a substantially uniform air flow at said orifice during pressure changes in said upstream portion.

2. A combination as defined in claim 1, in which the associated structure swings about a horizontal axis adjacent the top of the duct and the segmental surface is rectangular and in close clearance with the internal surfaces of the duct throughout the swinging movement.

3. A combination as defined in claim 1, in which the duct is substantially horizontally disposed.

4. A combination as defined in claim 1, in which the segmental portion of the swinging structure is at least a 90° segment of a cylinder.

5. The combination with a duct of an air-conducting system, of automatic pressure-equalizing means for regulating flow through said duct, said means comprising a segmental partition dividing the flow path through the duct into upstream and downstream portions and having an orifice intermediate its ends through which air may flow from the upstream to the downstream portion, and a member supported for swinging movement between opposed sides of the duct and having angularly disposed end portions of slightly less width than the interior width of the duct, one said end having an orifice substantially larger than the partition orifice for free flow of air through said end and the other end having an orifice of approximately the same size as the partition orifice for restricting the flow of air therethrough, and an imperforate segmental portion interconnecting said ends and disposed for swinging movement therewith in close clearance with the segmental partition under impelling flow of the airstream in the upstream portion directed against resistance surfaces of the member, whereby an imperforate surface of the segmental portion of the swinging member is disposed in different positions from partially lapping to fully uncovering the partition orifice so as to change the effective size of said partition orifice and thereby maintain a substantially uniform air flow through said partition orifice during pressure changes in the air flow approaching said partition.

6. A combination as defined in claim 5, in which the end of the swinging member having an orifice substantially larger than the partition orifice is the upstream end of said member.

7. A combination as defined in claim 5, in which the duct is substantially vertically disposed and means are disposed to limit the range of downward movement of the swinging member.

8. A combination as defined in claim 5, in which the partition orifice is of rectangular shape.

9. A combination as defined in claim 5, in which the partition is a segment of a cylinder.

10. A combination as defined in claim 9, in which the pivotal axis of the swinging member is the center of the cylinder of the partition and with no air flowing the swinging member hangs with its center of gravity in the vertical plane of said pivotal axis.

11. The combination with a duct of an air conducting system, of automatic pressure-equalizing means for regulating flow through said duct, said means comprising a segmental partition dividing the flow path through the duct into upstream and downstream portions and having an orifice intermediate its ends through which air may flow from the upstream to the downstream portion, a shaft within the duct supported by opposed walls thereof, and a member supported for swinging movement on the shaft and having angularly disposed end portions of slightly less width than the interior width of the duct, one said end having an orifice substantially larger than the partition orifice for free flow of air through said end and the other end having an orifice of approximately the same size as the partition orifice for restricting the flow of air therethrough, and an imperforate segmental portion interconnecting said ends and disposed for conjoint movement therewith in close clearance with the segmental partition under impelling flow of the airstream in the upstream portion directed against resistant surfaces of the member, whereby an imperforate surface of the segmental portion of the swinging member is disposed in different positions from partially lapping to fully uncovering the partition orifice so as to change the effective size of said partition orifice and thereby maintain a substantially uniform air flow through said partition orifice during pressure changes in the air flow approaching said partition.

References Cited

UNITED STATES PATENTS

| | | | |
|---|---|---|---|
| 2,320,194 | 5/1943 | Olsen | 137—504 |
| 2,749,833 | 6/1956 | Hekelaar | 137—504 |
| 3,173,356 | 3/1965 | Schierse et al. | 98—119 |

M. CARY NELSON, *Primary Examiner.*

ROBERT J. MILLER, *Assistant Examiner.*